United States Patent
Weis et al.

(10) Patent No.: US 6,779,554 B2
(45) Date of Patent: Aug. 24, 2004

(54) RETURN CHECK VALVE

(75) Inventors: Christoph Weis, Lörrach (DE); Martin Fangmeier, Auggen (DE)

(73) Assignee: Dieter Wildfang GmbH, Mullheim (DE)

( * ) Notice: Subject to any disclaimer, the term of this patent is extended or adjusted under 35 U.S.C. 154(b) by 0 days.

(21) Appl. No.: 10/471,325

(22) PCT Filed: Mar. 27, 2002

(86) PCT No.: PCT/EP02/03445

§ 371 (c)(1), (2), (4) Date: Sep. 9, 2003

(87) PCT Pub. No.: WO02/079678

PCT Pub. Date: Oct. 10, 2002

(65) Prior Publication Data

US 2004/0074539 A1 Apr. 22, 2004

(30) Foreign Application Priority Data

Mar. 29, 2001 (DE) .......................... 101 15 588

(51) Int. Cl.$^7$ .......................... F16K 15/06; F16K 47/00
(52) U.S. Cl. ..................... 137/511; 137/67; 137/512.3; 137/540; 137/904; 251/333
(58) Field of Search ................................. 137/511, 512, 137/512.2, 512.3, 535, 540, 67, 493.2, 904; 251/333, 334

(56) References Cited

U.S. PATENT DOCUMENTS

| 1,942,313 A | * | 1/1934 | Hyde et al. ............... 137/493.3 |
| 5,494,069 A | | 2/1996 | Bergmann |
| 6,648,010 B1 | * | 11/2003 | Goodwin ................. 137/493.1 |

FOREIGN PATENT DOCUMENTS

| DE | 43 23 496 A1 | 1/1995 |
| DE | 196 59 031 A1 | 6/1998 |
| EP | 0 291 375 | 11/1988 |
| GB | 2 268 571 A | 1/1994 |

* cited by examiner

Primary Examiner—Ramesh Krishnamurthy
(74) Attorney, Agent, or Firm—Volpe & Koenig, P.C.

(57) ABSTRACT

The invention relates to a backflow preventing check valve (1) comprising a housing (2) in which a closing member (3) is arranged. The closing member is moveable between a closed position and an open position and is disposed on a valve seat with a sealing area in the closed position. A pressure-compensation device is provided for when the backflow preventing check valve is closed and a volume of fluid is sealed off on the outflow side. In order to counteract an undesireable high pressure load when the check valve is closed, the outflow area defined by the closing body (3) in a closed position is joined to at least one pressure compensation chamber (6) whose receiving volume corresponds approximately to the expansion volume of the sealed-off fluid and which is disposed outside the area which is defined on the outflow side.

11 Claims, 2 Drawing Sheets

RETURN CHECK VALVE

BACKGROUND

The invention relates to a backflow preventing check valve with a housing in which a closing member is arranged, movable between a closing position and an opening position, and abutting with a sealing region on a valve seat in the closed position. A device is provided for pressure compensation when the backflow preventer is closed and a fluid volume is occluded on the outflow side.

Check valves are used in gas, water or the like supply lines in order to prevent a backflow of the fluid against the regular throughflow direction. Thus check valves are also increasingly being built into water lines, in order to counter the penetration of dirty water into the fresh water supply line in the case of a reduced pressure.

However, the use of such check valves in the field of single lever mixing fittings frequently gives rise to the problem that the water, which is trapped between the closed check valve on the one hand and the likewise closed valve seat on the other hand when the cold water side or hot water side is shut off, is strongly heated up by external influences until system pressures arise which lead to damage to the weakest portion of the supply line and thus frequently to the check valve. This can ultimately result in a closure of the supply line or to a likewise undesired crossflow.

A check valve of the kind mentioned at the beginning has therefore even already been provided, the housing of which has a partial region on the inflow side formed as a bellows and supported against the throughflow direction by an annular flange provided in the pipe line (cf. DE 196 50 031 A1); when an internal pressure increase builds up between the single lever mixing fitting and the check valve, the housing can thus be axially compressed in its partial region formed as a bellows, such that pressure relief occurs. In order to be able to attain a sufficient pressure relief, however, the housing has to have a comparatively large cross section and/or a long compressible partial region.

A check valve has therefore already been made which carries on the end of its closing member a hood-shaped extension with a lateral outlet opening (see WO 93/01 435). The bypass channel leading to the outlet opening of the extension, which serves as an excess pressure valve, is closed by means of a valve closure element which is lifted when the internal pressure rises, and releases the outlet opening for the fluid flowing back through the bypass channel. However, it is disadvantageous that with this check valve a partial quantity of the fluid can flow back through the closing member to the inflow side of the check valve.

SUMMARY

The object therefore exists in particular of providing a backflow preventer of the kind mentioned at the beginning which is distinguished by a constant, usual constructional length and which reliably prevents a backflow of the fluid. The backflow preventer is also to effectively counter an excessive internal pressure increase.

The attainment of this object according to the invention particularly is provided in that, in the backflow preventer of the kind mentioned at the beginning, at least one pressure compensation space is connected to the space bounded by the closing member on the outflow side in the closing position, which has a receiving volume corresponds approximately to the volume extent of the enclosed fluid, and is situated outside the space bounded on the outflow side.

The backflow preventer according to the invention has a pressure compensation space which is situated outside the space bounded on the outflow side. The space on the outflow side, bounded by the closing member in the closing position, is connected to a pressure compensation space. When the internal pressure increases, a partial quantity of the expanding fluid can temporarily escape into the pressure compensation space. Since the pressure compensation space is corresponds approximately to the volume extent of the enclosed fluid, a sufficient pressure relief is possible in order to prevent continuing damage due to pressure, perhaps to the backflow preventer.

A preferred embodiment according to the invention provides here that the pressure compensation space has as partitions a coating at least locally covering the closing member on the inflow side, together with the coated region of the closing member, and that the closing member has a passage channel between the outflow side and the pressure compensation space. In this embodiment, the closing member carries a coating which encloses the pressure compensation space between itself and the coated region of the closing member. A passage channel opens into this pressure compensation space, and is provided between the outflow side of the closing member and the pressure compensation space. When the internal pressure rises, a partial quantity of the fluid can get through the passage channel into the pressure compensation space, where it expands the coating of the closing member in the form of a bubble.

It is advantageous here if the pressure compensation space is about cushion-shaped and arranged on the inflow side of the closing member and preferably connected to this and, via a passage channel, connected to the outflow side.

A development of the invention of importance meriting its own protection provides that the cushion-shaped pressure compensation space extends over the side of the closing member facing the inflow side and preferably over its lateral sealing region, and forms in this sealing region a sealing inlay passing around between the closing member and a valve seat on the housing. The cushion-shaped pressure compensation space, preferably formed by a coating of the closing member, extends over the lateral sealing region of the closing member and forms there a sealing inlay passing around between the closing member on the one hand and the opposed valve seat on the other hand. When the internal pressure rises, not only does a pressure relief occur, but also the closing member with this sealing inlay is also increasingly pressed against the valve seat, so that the check valve is also capable of withstanding high pressures.

Another embodiment according to the invention provides that the pressure compensation space is formed as an annular sleeve locally covering at least the inside of the inflow side housing section and connected to the outflow side by a passage channel. In this embodiment, an annular sleeve is provided which locally covers the inner side of the inflow-side housing section. The annular sleeve encloses between itself and the housing inner wall a pressure compensation space which is connected by a passage channel to the outflow side of the backflow preventer.

Also in this embodiment, the annular sleeve can extend as far as over the region of the valve seat and thereby form there a sealing inlay passing around between the closing member and the valve seat on the housing.

An embodiment according to the invention which can be produced from few parts provides that the annular sleeve extends out as far as over an outer sealing region and forms there an outer ring seal, at which the annular seal preferably has an annular bead.

It is particularly advantageous if the wall of the pressure compensation space is formed of silicone or the like elastic material. If the coating of the closing member, the annular sleeve or the like wall of the pressure compensation space is formed of silicone or another elastic material, this wall can expand in the form of a bubble when the internal pressure rises.

A development according to the invention of importance meriting its own protection provides that the passage opening leading to the passage channel or the like to the pressure compensation space is tightly closed by a closure piece and that the closure piece is formed as a predetermined breaking place, has a predetermined breaking place, and/or is bordered by a predetermined breaking place, which opens the passage channel or the passage opening when a defined fluid pressure is exceeded on the inflow side of the closing member. In this developed embodiment, the passage opening leading to the pressure compensation space is tightly closed by a closure piece. If the fluid pressure on the outflow side of the closing member exceeds a defined limiting value, the passage opening is opened at the predetermined breaking places in the region of the closing member. Thus the closure piece protects the pressure compensation space up to a defined pressure value, so that this pressure compensation space remains unloaded as long as the fluid pressure on the outflow side of the closing member does not exceed the defined limiting value.

Here it is particularly advantageous if the closure piece is formed as a weakening of the material of the closing member or of the housing in the region of the passage channel or the like passage opening.

BRIEF DESCRIPTION OF THE DRAWINGS

Further features of the invention will become apparent from the following description of an embodiment example according to the invention in connection with the claims and also the accompanying drawing. The individual features can be embodied individually or collectively in an embodiment according to the invention.

DETAILED DESCRIPTION OF THE PREFERRED EMBODIMENTS

Figure 1:
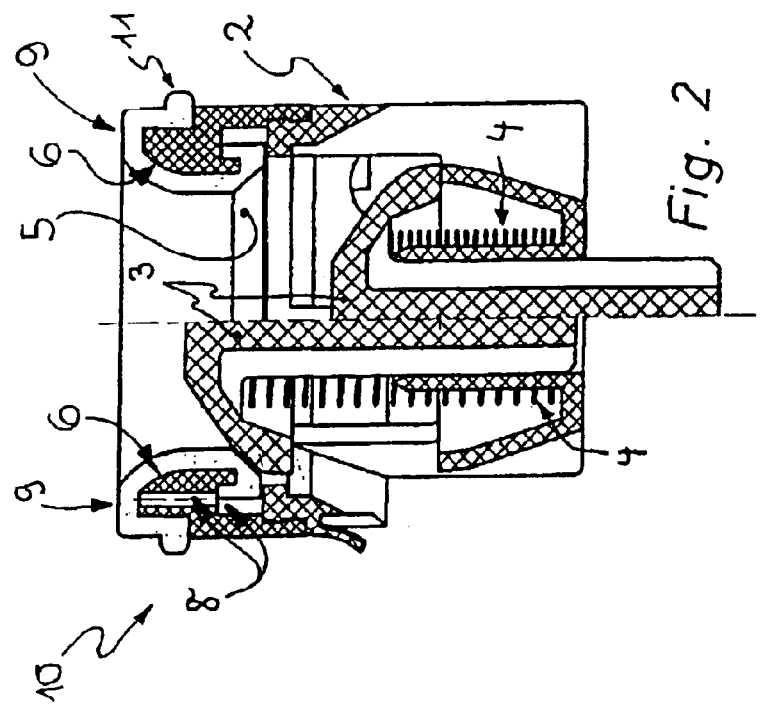
FIG. 1 is a cross-sectional view of a backflow preventer, the closing member of which carries a coating which encloses a pressure compensation space between itself and the coated region of the closing member.
Figure 2:
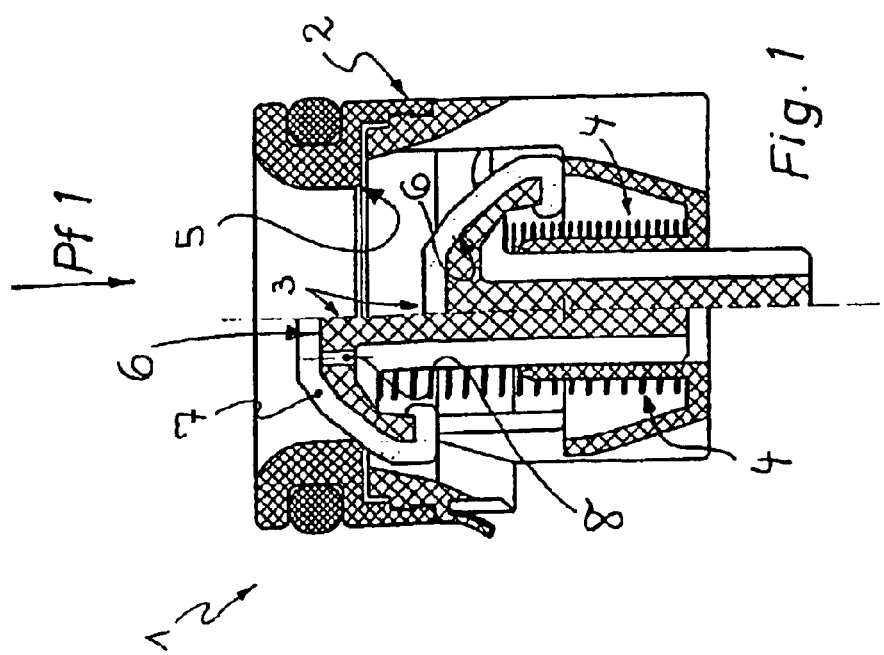
FIG. 2 is a cross-sectional view of a backflow preventer in which the pressure compensation space is formed by an annular sleeve which is provided on the inside of the inflow side housing section.

Two backflow preventers 1, 10 are shown in FIGS. 1 and 2, and can be used in a fluid line in the region of a water fitting. The backflow preventers 1, 10 can for example serve as a cold or hot water check valve which is connected on the cold or hot water side upstream from a single lever fitting.

The backflow preventers 1, 10 have a housing 2 in which a closing member 3 is provided in the throughflow direction Pf 1, movable between a closed position and an open position. The closing member 3 is movable from its closed position, respectively shown on the left-hand side, against the force of a return spring 4 into its open position, respectively shown on the right-hand side. In the closed position, the closing member 3 of the backflow preventer 1, 10 abuts on a valve seat 5.

If the single lever mixing fitting is closed, the water enclosed between the water fitting and the cold or hot water check valve 1, 10 can itself for example or due to a rise in the surrounding temperature, warm up or heat up such that an extremely high system pressure arises. So that this high system pressure does not cause continuing damage, the backflow preventers 1, 10 respectively have a device for pressure compensation.

The backflow preventers 1, 10 have for this purpose at least one pressure compensation space 6 to which is connected the space bounded on the outflow side by the closing member 3 in the closed position.

When the internal pressure rises, a partial quantity of the expanding fluid can temporarily escape into the pressure compensation space 6. Since the pressure compensation space 6 is corresponds approximately in its receiving volume to the expansion volume of the occluded fluid, a pressure relief is possible which is sufficient to prevent continuing damage due to pressure, possibly to the backflow preventers 1, 10.

As can be seen in FIG. 1, the closing member 3 has on the inflow side a cushion-shaped coating 7 or the like layer of material which encloses the pressure compensation space 6 between itself and the coated closing member region. The closing member 3 has a passage channel 8 which is provided between the outflow side of the closing member 3 and the pressure compensation space 6.

When the internal pressure rises, a partial quantity of the expanding fluid can penetrate through the passage channel 8 into the pressure compensation space 6, which expands like a bubble with the increasing internal pressure and thus effects pressure relief.

The cushion-shaped coating 7 extends over the lateral sealing region of the closing member 3 and forms in this sealing region a sealing inlay passing around between the closing member 3 and the valve seat 5. When the internal pressure rises, there thus takes place not only pressure relief, but also the closing member 3 is also increasingly pressed with this sealing inlay against the valve seat 5, so that the backflow preventer 1 is also capable of withstanding high pressures.

In the backflow preventer 10 shown in FIG. 2, the pressure compensation space 6 is formed by an annular sleeve 9, which covers the inner side of the inflow side housing section. The bounding walls of the pressure compensation space 6 are here formed by the annular sleeve 9 and also the adjacent housing inner wall. Also the pressure compensation space 6 of the backflow preventer 10 shown in FIG. 2 is connected via a passage channel 8 to the outflow side of the backflow preventer 10.

As will be clear from FIG. 2, the annular sleeve 9 extends at its one peripheral edge as far as over the region of the valve seat 5 and thus forms there a sealing inlay passing around between the closing member 3 and the valve seat 5 provided on the housing 2.

The annular sleeve 9 extends with its other peripheral edge as far as over the outer sealing region of the backflow preventer 10 and forms there an outer ring seal which seals the housing of the backflow preventer with an annular bead 11 against the pipe line, not further shown here.

Since the annular sleeve 9 of the backflow preventer 10 shown in FIG. 2 and the coating 7 in the backflow preventer shown in FIG. 1 are formed of silicone or another elastic material, it abuts well on the wall enclosing the pressure compensation space 6, in order to expand in the form of a bubble when the system pressure increases as far as over 16 bar.

In an embodiment according to the invention, not further shown here, the backflow preventer can carry, not only an annular sleeve 9, but also in addition a coating 7 on its closing member 3.

The backflow preventers shown here are in particular provided for use in thermostat fittings. Since a partial quantity of the fluid which expands during heating is received in the pressure compensation space 6 and forms an elastic bubble there, and since this partial quantity of the fluid can flow back into the pipe line after the internal pressure subsides, contamination of the drinking water is reliably prevented. Here the annular sleeves 9 or the coatings 7 can be firmly mounted, or respectively sprayed, adhered, welded, or otherwise non-releasably retained, on the housing or respectively on the closing member 3. It is also possible to produce the housing and/or the closing member as multi-component injection molded parts, in which one of the components forms the annular sleeve 9 or respectively the material layer 7. The required pressure compensation spaces can correspond approximately to the fluid volume and its pressure to be expected by the design of the annular sleeve 9 or of the coatings 7, and the choice of material.

Figure 3:
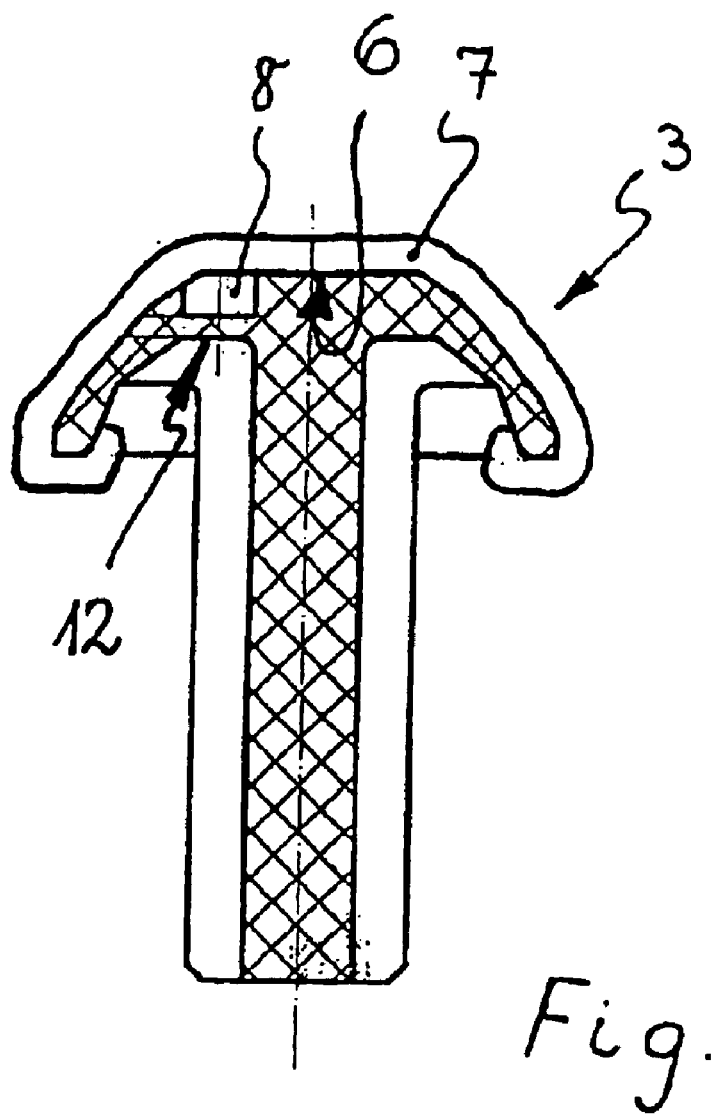
FIG. 3 is a view of a coated closing member which includes a pressure compensation space between a coated closing member partial region and the coating of elastic material, the passage opening leading to the passage space being closed by a closure piece formed as a rupturable disk, and the closure piece being formed as a material weakening of the closing member serving as a predetermined breaking place which opens the passage opening when a defined liquid pressure on the outflow side of the closing member is exceeded.

A coated closing member 3 is shown in FIG. 3, and is comparable to the closing member 3 of the backflow preventer 1 shown in FIG. 1. The closing member 3 according to FIG. 3 also defines a pressure compensation space 6 between its coated closing member partial region and the coating 7. The closing member 3 according to FIG. 3 likewise has a passage channel 8, which is provided between the outflow side of the closing member 3 and the pressure compensation space 6. Here the passage channel 8 is tightly closed by means of a closure piece 12 designed as a rupturable disk. The closure piece 12 is designed as a weakening, serving as a predetermined breaking place, of the material of the closing member 3, and opens the passage channel 8 when a defined fluid pressure is exceeded on the outflow side of the closing member. Up to this defined limiting value, the closure piece 12 protects the coating 7 formed as a silicone membrane, which for example can be reasonable, considering trials in testing institutes in which 16 bar of back pressure was applied 50,000 times to the closing member 3. If the closure piece 12 then set to a limiting value of about 20 bar, the silicone membrane or the like coating 7 bounding the pressure compensation space 6 is not further loaded, as a result of the trials carried out with lower pressures. If the defined limiting value is exceeded in the case of use in a thermostat, in which also high pressures are very quickly reached, the closure piece 12 fails as intended, so that the pressure prevailing on the outflow side of the closing member 3 is rapidly reduced again.

A comparable closure piece can of course also be provided in the passage channel 8 of the backflow preventer 10 shown in FIG. 2.

What is claimed is:

1. Backflow preventer (1, 10) comprising a housing (2), in which a closing member (3) is arranged which is movable between a closed position and an open position and abuts with a sealing region on a valve seat (5) in the closed position, a device being provided for pressure compensation when the backflow preventer (1, 10) is closed and a fluid volume is occluded on an outflow side, wherein the space bounded on the outflow side by the closing member (3) in the closed position is connected to at least one pressure compensation space (6), which has a receiving volume which is corresponds approximately to an expansion volume of the occluded fluid, and which is situated outside a space bounded on the outflow side.

2. Backflow preventer according to claim 1, wherein the pressure compensation space (6) has as bounding walls a coating (7) at least locally covering the closing member (3) on an inflow side and a coated closing member region, and wherein the closing member (3) has a passage channel (8) between the outflow side and the pressure compensation space (6).

3. Backflow preventer according to claim 2, wherein the pressure compensation space (6) is generally cushion-shaped and arranged on the inflow side of the closing member (3) and connected thereto and also connected to the outflow side via the passage channel (8).

4. Backflow preventer according to claim 3, wherein the cushion-shaped pressure compensation space (6) extends over a side of the closing member (3) facing toward the inflow side and extends over a lateral sealing region, and forms in the sealing region a sealing inlay extending around between the closing member (3) and the valve seat (5) on the housing (2).

5. Backflow preventer according to claim 1, wherein the pressure compensation space (6) is formed as an annular sleeve (9) locally covering at least an inner side of an inflow-side housing section and connected via a passage channel (8) to the outflow side.

6. Backflow preventer according to claim 5, wherein the annular sleeve (9) extends as far as over a region of the valve seat (5) and forms there a sealing inlay extending around between the closing member (3) and the valve seat (5) on the housing (2).

7. Backflow preventer according to claim 5, wherein the annular sleeve (9) extends outward as far as over an outer sealing region and forms there an outer annular seal.

8. Backflow preventer according to claim 7, wherein the annular sleeve includes an annular bead (11).

9. Backflow preventer according to claim 1, wherein a wall of the pressure compensation space (6) is comprised of silicone or an elastic material.

10. Backflow preventer according to claim 1, wherein the passage channel (8) or passage opening leading to the pressure compensation space (6) is tightly closed by a closure piece (12), and wherein the closure piece (12) is at least one of designed as a predetermined breaking place, includes a predetermined breaking place, or is bordered by a predetermined breaking place, which opens the passage channel (8) or the passage opening when a defined fluid pressure is exceeded on the outflow side of the closing member.

11. Backflow preventer according to claim 10, wherein the closure piece (12) is formed as a weakening of a material of the closing member (3) or of the housing (2) in a region of the passage channel (8) or the passage opening.

* * * * *